United States Patent [19]
van Tao et al.

[11] Patent Number: 4,624,971
[45] Date of Patent: Nov. 25, 1986

[54] PHOTO SETTING COMPOSITION FOR COATING SUBSTRATES WITH AN ABRASION-RESISTANT TRANSPARENT OR TRANSLUCENT FILM

[75] Inventors: Nguyen van Tao, Cruseilles, France; Günter Bellmann, Commugny, Switzerland

[73] Assignee: Battelle Development Corporation, Columbus, Ohio

[21] Appl. No.: 693,719

[22] Filed: Mar. 1, 1985

Related U.S. Application Data

[62] Division of Ser. No. 414,356, Aug. 27, 1982, abandoned.

[30] Foreign Application Priority Data

Jan. 15, 1981 [CH] Switzerland ........................ 240/81
Jan. 11, 1982 [WO] PCT Int'l Appl. ... PCT/EP82/00004

[51] Int. Cl.$^4$ .................. C08F 2/50; B32B 27/16; B32B 27/30; B32B 27/36
[52] U.S. Cl. ........................................ 522/37; 522/39; 522/44; 522/46; 522/48; 522/53; 522/65; 522/83; 522/121; 522/142; 523/209; 525/288; 525/404; 525/479; 428/404; 428/412; 428/519
[58] Field of Search .................. 204/159.23; 522/37, 522/39, 44, 46, 48, 53, 65, 83, 121, 142

[56] References Cited

U.S. PATENT DOCUMENTS

| | | | |
|---|---|---|---|
| 3,066,112 | 11/1962 | Bowen | 260/41 |
| 3,862,920 | 1/1975 | Foster | 106/35 |
| 4,150,012 | 4/1979 | Joos | 32/15 |
| 4,267,097 | 5/1981 | Michl | 260/998.11 |
| 4,310,600 | 1/1982 | Cross | 428/447 |
| 4,374,937 | 2/1983 | Nemcek | 523/116 |
| 4,482,656 | 11/1984 | Nguyen | 523/212 |

FOREIGN PATENT DOCUMENTS

| | | |
|---|---|---|
| 2403211 | 7/1975 | Fed. Rep. of Germany . |
| 2405578 | 8/1975 | Fed. Rep. of Germany . |
| 1358350 | 7/1974 | United Kingdom . |

Primary Examiner—John C. Bleutge
Assistant Examiner—A. H. Koeckert
Attorney, Agent, or Firm—Benjamin Mieliulis

[57] ABSTRACT

A process is disclosed for producing an abrasion resistant UV curable photopolymerizable composition for coating substrates. The process involves dense grafting and comprises hydrolyzing in an aqueous acidic solution a trialkoxysilane to render it organophillic followed by dispersion with fine silica or alumina. Grafting of the hydrolyzed trialkoxysilane to the silica or alumina is effected through dehydration. The grafted material is then dispersed into intimate contact with one or more photopolymerizable monomers and photoinitiators.

4 Claims, No Drawings

PHOTO SETTING COMPOSITION FOR COATING SUBSTRATES WITH AN ABRASION-RESISTANT TRANSPARENT OR TRANSLUCENT FILM

This application is a divisional application of co-pending U.S. Ser. No. 414,356, filed Aug. 27, 1982, now abandoned, filed as International Application PCT/EP82/00004 with International Filing date Jan. 11,1982 and priority application number 240/81-0 (European Patent Application) with priority date Jan. 15, 1981.

FIELD OF THE INVENTION

The present invention relates to scratch-resistant surfaces and more particularly concerns a photopolymerizable composition to be applied on a substrate so as to produce thereon a translucent or transparent coating resisting corrosion and abrasion. This coating is intended to protect said substrate against shocks, bruises and other mechanical accidents as well as against wear resulting from normal use. Such composition is very useful in all industrial fields where it is desirable to avoid, as much as possible, that sensitive objects exposed to shock and wear be progressively damaged. This is particularly important when dealing with transparent articles such as optical goods the surface of which must be protected by all means against scratches not to lose its desirable optical properties.

It has been definitely established by now that the manufacture of high performance optical ware by using transparent organic materials is possible the working of which, by casting or any other machining means, is much easier and more economical than with corresponding articles of ordinary glasses from metal oxides. On the other hand, such articles of "organic glass" are relatively soft and poorly resist abrasion, wear and corrosion by external agents. Thus, it is desirable to cover such articles with an anti-abrasion and anti-corrosion protective film but thin enough for not significantly altering the optical properties of the substrate.

THE PRIOR-ART

Very many coating compositions and application methods have already been proposed for achieving the aforementioned object, this being with variable success.

Among all these compositions of the prior-art, some are particularly relevant that owe their properties to the presence of compounds from elements other than the usual constituents of organic matter and, in particular, to aluminum and silicon in the form of specific mineral or organic compounds. With reference to silicon, for instance, some of the techniques used involve the build-up of a protective coating on substrate, this coating being obtained from the vapor phase deposition of glass or silica evaporated under vacuum. Polysiloxane based protective coatings can also be obtained, the structure of which resembles to some extent that of cross-linked polysilicic acid, by the in-situ polymerization of organosilicon compounds previously partly hydrolyzed. During the hardening (curing) of such coatings, polymerization occurs, either due to the formation of Si-O-Si bridges (by the dehydration of silanol functions), or due to the participation of polymerizable organic groups belonging to substituents possibly present on the silicon atoms (olefins, epoxy-, armino- groups, etc.), or by a combination of the said two polymerization modes. From the references illustrating such techniques, the followings can be cited: A. J. REEDY, Res. Discl. 1978, 171-6; Patents USP 4,006,271; 4,098,840; 4,186,026, 4,197,335; JP (Kokai) 77, 101.235; 112.698; 152.426; 154.837; 79, 60.335; 62.267; 119.597; 119.599; 129.095 to 129.099; 133.600; 144.500; 148.100; 80, 05.924; and DOS 2.803.942; 2.805.552; 2.820.391; 2,831.220; 2.917.440. However, despite the protection they impart to the substrate on which they are applied, these coatings have some drawbacks. One of such disadvantages is related to the relatively high temperatures needed for curing polysilicic type coatings which can lead to substrate deformation. Another drawback is inherent to the expansion coefficient of the polysiloxane coatings which is often sufficiently different from that of the substrate for causing the development of adhesion problems (for instance in the case of polycarbonate or polymethacrylate organic glasses) and of cracks or crazing after alternating hot and cold periods (particularly in the case of articles subjected to weathering like automobile head-lights). Adhesion problems were partially solved by interposing an intermediate bonding sublayer between the coating and the substrate but, more generally, it has been sought to remedy the above-mentioned drawbacks by replacing the coatings from polymerized silicon compounds by compositions comprising, dispersed within an organic or silico-organic matrix, fine particles of silica or alumina. Thus, there were used in this context aqueous mixtures of silicon compounds, colloidal silica and hydrocompatible solvents (alcohols, glycols, etc.), with or without polymerizable organic monomers. Examples of such uses can be found in the following references: Belgian Pat. Nos. 821.403; 877.372; U.S. Pat. No. 4,027,073; 4,188,451; 4,177,315; GB Pat. Nos. 2,018,621; 2,018,622; DOS No. 2.811.072 and JP (Kokai) No. 79, 157.187. However, colloidal silica being essentially hydrophilic, as are also the other types of silica such as amorphous, crystalline, microcrystalline, precipitated and pyrogenic silicas, it is well compatible, in general, only with hydrophilic polymers, for instance organosilicon polymer, whereas it is much less or not miscible with typical hydrophobic resins such as polyolefins, which very strongly restricts its use as a filler in the film forming thermosetting or photo-setting compositions. Moreover, adding hydrophilic silica to organic polymerizable monomers leads to the formation, with relatively low concentrations of solids, e.g. about 5 to 10% by weight, of highly thixotropic masses (non-Newtonian rheologic behaviour) which are very difficult to apply as thin layers on substrates. Hence, attempts were made to remedy this disadvantage, i.e. to increase the level of silica in organic resin coatings, while overcoming such application problems, by treating the particles so as to make them organophilic. It should be remarked at this stage that methods for imparting hydrophobic organophilic properties to alumina or silica particles are already known, per se; however it does not appear that there exists, by now, methods for giving to silica or alumina particles sufficient organophilic properties to enable them to be incorporated at high levels (of about 40% by weight or more) into polymeric resin films, while maintaining suitable rheological properties for application and nearly complete transparency of the films formed. Yet, ensuring proper transparency of the protective coatings of optical goods is a fundamental requirement, as will be seen hereinafter in the description of the present invention. As pertinent references regarding the methods for "treating" silica or alumina particles for rendering them organophilic, South African Pat. No. 72.5180 and Japanese Pat. (Kokai) No. 77, 138.154 can be cited. In the first of these references, silica particles are treated with trimethylchlorosilane which, by reaction with the silanol groups of said particles, generates hydrophobic groups of formula

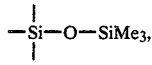

whereby said particles are rendered compatible with a mixture of olefinic monomers (ethylenic and acrylic monomers). These particles are then incorporated, to a level of about 5-10% by weight and together with a proportion of alumina about 10 to 20 times greater, into a mixture of polymerizable resins which, after curing, provides insulators for high electric voltages. Such materials are however opaque and their resistance to abrasion is not indicated. In the second of the two references cited above, particles of alumina are coated with —(glycidyloxy)-propyl-trimethoxysilane and a mixture containing about 25% by weight of such treated alumina and an epoxy resin is used for coating a polycarbonate article so as to obtain, after polymerization, an abrasion-resistant film. Moreover, in the following references, there are described methods for attaching organic groups such as vinyl, methacryl, epoxy, glycidoxy to hydrophilic silica so as to impart thereto hydrophobic properties: L. P. ZIEMJANSKI et al, Rubber World 163, 1 (1970); M. W. RANEY et al, Meeting of the Div. of Rubber Chem., ACS Meeting, Cleveland, Ohio (1971); M. W. RANEY et al, Meeting of the Div. of Rubber Chem., ACS, Miami, Fla (1971); HI-SIL Bulletin 41, Jan. 1971, PPG Industries.

In addition to the above mentioned prior-art, some further U.S. patent references can be cited in connection with the following subjects pertinent to the invention:

1. $SiO_2$: U.S. Pat. Nos. 3,986,997; 4,177,315; 4,188,451; 4,242,403
1A. Treated $SiO_2$, e.g. to make it hydrophobic: U.S. Pat. Nos. 2,610,167; 2,818,385; 3,652,379; 4,001,128.
2. Forming $SiO_2$ in situ, e.g. hydrolyzing organic silicates: U.S. Pat. Nos. 2,404,357; 2,404,426; 3,971,872; 4,049,868; 4,120,992; 4,186,026
3. Using siloxanes and/or silanes and the like: U.S. Pat. Nos. 2,610,167; 3,389,114; 3,801,361; 3,953,115; 3,986,997; 4,001,128; 4,006,271; 4,026,826; 4,027,073; 4,029,842; 4,049,868; 4,177,315; 4,186,026; 4,188,451; 4,197,335; 4,242,403
4. Combination of any of the above items with:
4A. Polymers: U.S. Pat. Nos. 2,404,357; 2,404,426; 2,610,167; 3,652,379; 3,801.361; 3,971,872; 4,001,128; 4,026,826; 4,049,868; 4,098,840; 4,120,992; 4,197,335; 4,242,403
4B. Prepolymers (oligomers or monomers): U.S. Pat. Nos. 3,819,562; 4,029,842; 4,197,335
4B1. Photopolymerizable monomers: U.S. Pat. Nos. 3,968,305; 3,968,309; 4,188,451
4C. Other chemicals, e.g. solvents, fillers cross-linking agents, to obtain transparent abrasion-resistant coatings (as single or composite systems): U.S. Pat. Nos. 3,986,997 (acidic alcohol $H_2O$ solution); 4,001,128 ($Al_2O_3$); 4,006,271 (solvent); 4,027,073 (acidic alcohol water solution); 4,049,868; 4,186,026 and 4,120,992 (cross-links with formaldehyde); 4,120,992.
5. Miscellaneous routes to such coatings: thus U.S. Pat. No. 3,645,779 provides a vacuum vapor deposited coating of $B_2O_3-SiO_2$ on organic glass; U.S. Pat. No. 4,051,297 discloses a sputtered film of chromium silicide on smooth surfaces; in U.S. Pat. No. 4,242,403, there is disclosed a polyethylene terephthalate sheet covered with an intermediate layer of —(3,4-epoxycyclohexyl)-ethyltrimethoxysilane and an upper layer of silica reinforced organopolysiloxane resin.

In spite of the progress achieved by the above mentioned techniques, it was still desirable to have at hand a quick setting composition for providing thin translucent or transparent films very resistant to abrasion by virtue of a high level therein of hydrophobic silica. Thus, a first object of the invention was to provide a composition for depositing transparent protective films on substrates, such films being sufficiently mechanically resistant to withstand normal wear or accidental abuses without impairment of the surface properties.

A second object of the invention was to provide a composition for coating protective transparent films on optical goods, the optical properties of which will not be significantly modified by this film and which will keep such properties for a significant period of time under adverse conditions.

Another object of the invention is to provide a composition for depositing thin well adhering films on substrate, such adhesion not being affected by weathering conditions even after a prolonged period of exposure.

Another object of the invention is to provide a film forming composition that will strongly adhere to organic glass substrate and which can be cured at room temperature, i.e. much below the softening temperatures of the substrate.

Another object of the invention is to provide a composition for making transparent scratch-resistant films, such films being coated on substrates as one layer films, i.e. without the need of an intermediate bonding layer.

Still another object of the invention is to provide a composition that can be stored for prolonged periods at room temperature without hardening and which can be cured on the substrates in a matter of seconds without the use of elevated temperatures.

Another object of the invention is to provide industrial optical articles made of relatively soft and easy moldable organic glasses protected with a scratch resistant film that will withstand prolonged use under severe weathering conditions without discoloration, crazing or significant adhesion losses.

Other objects of the present invention will become apparent to people skilled in the art from the description of the invention that follows and from the disclosed preferred embodiments thereof.

SUMMARY OF THE INVENTION

The present invention enables to achieve the aforementioned objects. Indeed, the invention provides a photo-polymerizable composition comprising one or more photo-polymerizable monomers, at least one phtoinitiator and $SiO_2$ or $Al_2O_3$ particles having, grafted on some of the oxygen atoms thereof, substituents of the formulae $A^1$ (I) or $SiA^1A^2A^3$ (II) wherein $A^1$ represents R or OR groups, R being a saturated or unsaturated substituted or unsubstituted hydrocarbon radical and $A^2$ and $A^3$ either represent oxygen atoms for connecting the Si atom in formula (II) to neighboring silicon or aluminum atoms of the silica or alumina particle, or they have the same definition as for $A^1$. Naturally when, by virtue of the aforesaid definition, the Si atom in (II) bears more than one R or OR groups, the R's can be the same or they can be different. The detailed nature of the R's will be explained in a moment.

One distinctive feature of the composition of the invention is that the total number of carbon atoms which are included in formulae (I) or (II), i.e. in $A^1$, or in $A^1$ plus $A^2$ and/or $A^3$ in case more than one of the A's on the Si atom of (II) are R and/or OR groups, should always be four or more in order to obtain rheological properties of the coating compositions containing high concentrations of coated particles that allow satisfactory practical application of the compositions to organic glass substrates. For example, as will be cited later, suitable coatings were not obtained with compositions containing silica treated with silicon compounds having less than four carbon atoms, while other compositions involving four or more carbon atoms gave satisfactory results (see data in table VIIa versus those in tables VI and VII).

Another distinctive feature of the composition is that the refraction index "n" of the organic phase of the composition should be as near as possible to that of the particles used. Furthermore, if the refraction index in the protective film of the organic matrix which is composed of the various organic constituents of the composition is not near that of the mineral particles, then said protective film is not perfectly clear but only translucent, this effect being particularly significant with high levels of mineral fillers, for instance of the order of 10 or 20 to 40% by weight. Thus, it was noticed that if the index "n" of the organic mixture is between 1.45 and 1.48, there is obtained with for instance a pyrogenic silica of index "n"=1.475, even at high concentration levels, excellent clear coatings even for thicknesses thereof of the order of several microns. In the case of alumina (n=1.60-1.76), such index values for the organic phase are nowadays impossible to achieve and, for this reason, the coatings containing high proportions of alumina are translucent and not transparent. In general, it is preferred within the scope of the invention to use particles with 1.40<n<1.50 and an organic phase the "n" of which lies in the same range.

PREFERRED EMBODIMENTS OF THE INVENTION

It should be noted that the size of the particles is important with respect to the optical properties of the present protective coating. Thus, using relatively large particles, i.e. having a diameter of about the same order of magnitude as of the thickness of the film produces at the surface thereof microscopic prominences not visible with the eye but being detrimental to the optical properties thereof (undesirable light reflection and diffraction effects) and may impart thereto a milky appearance. To be perfectly clear, the film should have a flawless, smooth, mirror-like surface. Consequently, there will preferably be used particles of a size about one order of magnitude less than the coating thickness. Thus, for instance, with coatings having a thickness of the order of one micron or less, there are advantageously used particles sizes of 0.007 to $0.05\mu$ (pyrogenic $SiO_2$: AEROSIL (Degussa, Germany), CAB-O-SIL (Cabot Corp. USA); precipitated silica: Hi-SIL (PPG Industries, USA), etc.). For thicker coatings, larger size particles are possible, for instance 0.02 to $0.1\mu$ (precipitated silica). The same is true for alumina, corresponding requirements for this mineral filler being however less, since films loaded with $Al_2O_3$ are usually not transparent per se. As suitable alumina for the present composition, there can be mentioned a product called ALON (Alcan, Canada), the particles of which have a size approximately $0.006\mu$. The silicas used or tried within the limits of this invention are the followings:

| Name and type of silica | Specific area ($m^2/g$) | Particle size ($\mu m$) |
| --- | --- | --- |
| Pyrogenic silica | | |
| CAB-O-SIL | | |
| EH-5 | 390 ± 40 | 0.007 |
| H-5 | 325 ± 25 | 0.007 |
| M-5 | 200 ± 25 | 0.012 |
| L-5 | 50 | 0.05 |
| AEROSIL | | |
| 380 | 380 ± 30 | 0.007 |
| 300 | 300 ± 30 | 0.007 |
| 200 | 200 ± 25 | 0.012 |
| 130 | 130 ± 25 | 0.016 |
| Precipitated silica | | |
| Hi-SIL | | |
| 233 | — | — |
| 215 | 150 | 0.02 |
| SILENE EF | 90 | 0.03 |
| Organophilic silica* | | |
| AEROSIL R-972 | 120 ± 30 | 0.016 |

*This silica was made organophilic by reacting with trimethylchlorosilane, the number of carbon atoms per grafted silicon atom is thus only three which does not correspond to the standards required for embodying the invention. Indeed, under testing, this hydrophobic silica did not provide compositions with properties suitable for achieving protective coatings according to the invention.

Regarding the photopolymerizable monomers that fit the requirements of the present invention, one can use most monomers or mixtures of monomers generally known to photopolymerize and the photopolymerization of which is fast enough under usual conditions to be completed shortly (i.e. with exposure times from about a few seconds to a few minutes) and the "n" indexes of which fall within the aforementioned limits. Examples of such monomers (olefinic and preferably acrylic) can be found in the following reference: UV Curing by S. Peter PAPPAS, Science & Technology, Technology Marketing Corp., USA (1978).

Among the monomers usable in the present invention, there can be mentioned also some olefinic prepolymers with a photopolymerizable function which possess, at the start, a significant intrinsic viscosity. This feature is valuable when it is wished to deposit with the present composition a relatively thick film but with sufficient flow stability during the period before the photopolymerization not to collapse and spread out or run away from the substrate before curing. Such prepolymers are known in practice most often under generic commercial names such as UVITHANE (Thiokol Corp.), EBECRYL (Union Chimique Belge), UCAR-X (Union Carbide), SETAROL (Kunstharsfabrick Syntehse NV, Holland). The structure of such prepolymers which fit well in the invention, provided they have the proper refraction indexes, are generally not disclosed publicly except for the fact that they are mainly polyolacrylates (polyesterglycols) or polyurethane-glycols. In practising the invention, one should use either monomers the "n" index of which is intrinsically close to that of the mineral filler used or, and this is the most frequent case, mixtures of photopolymerizable monomers and/or prepolymers the mixture index of which comes as near as possible to that of said mineral filler. By suitably varying the proportions of the two or more monomeric constituents the respective indexes of which are above and below the desired value, the latter can be approximated close enough for eventually obtaining, with the composition according to the invention, a practically transparent protective film with silica contents of up to 40% by weight or more. As non limiting examples, Tables I and II below give a list of such possible monomeric ingredients in the form of individual constituents or of mixtures (proportions of constituents in the mixtures are given), the refraction indexes thereof as well as viscosities under standard conditions.

TABLE I

| Monomer | Refractive index "n_D20" | Viscosity cP |
|---|---|---|
| Methyl acrylate | 1.4040 | max. 10 |
| Methyl methacrylate | 1.4142 | max. 10 |
| Ethylene glycol diacrylate (EGDA) | 1.4550 | max. 10 |
| 1-6-Hexanediol diacrylate (HDDA) | 1.4574 | max. 10 |
| 1,4-Butanediol diacrylate (BUDA) | 1.4567 | max. 10 |
| Neopentylglycol diacrylate (NPGDA) | 1.4515 | max. 10 |
| Diethyleneglycol diacrylate (DEGDA) | 1.4621 | max. 10 |
| Tripropyleneglycol diacrylate (TPGDA) | 1.4495 | max. 10 |
| Tetraethyleneglycol diacrylate (TEGDA) | 1.4616 | max. 10 |
| Bisphenol-A diacrylate (EBECRYL-150) | 1.5415 | 1000 ± 20% |
| Trimethylolpropane triacrylate (TMPTA) | 1.4738 | 70 ± 20% |
| Pentaerythritol triacrylate (PETIA) | 1.4871 | 650 ± 20% |
| Pentaerythritol tetraacrylate (PETEA) | 1.4855 | 800 ± 20% |
| Dipentaerythritol pentaacrylate | 1.4932 | 4400 ± 20% |
| EBECRYL-210 (Acrylic prepolymer) | 1.4980 | $125.10^3 \pm 20\%$ |
| EBECRYL-220 (Acrylic prepolymer) | 1.5030 | $18.10^3 \pm 10\%$ |
| EBECRYL-230 (Acrylic prepolymer) | 1.4646 | $6.10^4 \pm 30\%$ |
| EBECRYL-240 (Acrylic prepolymer) | 1.4743 | $3.10^4 \pm 50\%$ |
| EBECRYL-270 (Acrylic prepolymer) | 1.4755 | $15.10^4 \pm 13\%$ |
| UVITHANE-782 (Acrylic prepolymer) | 1.5024 | paste |
| UVITHANE-783 (Acrylic prepolymer) | 1.5264 | paste |
| UVITHANE-788 (Acrylic prepolymer) | 1.5085 | paste |
| UCAR X-117 (Acrylic prepolymer) | 1.4816 | $135.10^2 \pm 1\%$ |
| UCAR X-118 (Acrylic prepolymer) | 1.4898 | $17.10^2 \pm 5\%$ |
| UCAR X-125 (Acrylic prepolymer) | 1.4978 | $106.10^2 \pm 1\%$ |
| EBECRYL-600 (epoxyacrylate) | 1.53 | $4-8.10^2$ (60° C.) |
| EBECRYL-601 (epoxyacrylate) | 1.55 | $2.10^5 \pm 10\%$ |
| EBECRYL-830 (acrylic polyester) | 1.5005 | $45.10^3 \pm 10\%$ |
| EBECRYL-810 (acrylic polyester) | 1.4675 | 500 ± 40% |
| SETAROL-3625 (olefinic polyester) | — | solid |
| Ethylene glycol dimethacrylate | 1.4527 (25° C.) | max. 10 |

TABLE I-continued

| Monomer | Refractive index "n_D20" | Viscosity cP |
|---|---|---|
| (EDGMA) | | |
| Diethylene glycol dimethacrylate (DEGDMA) | 1.4580 (25° C.) | max. 10 |
| Triethylene glycol dimethacrylate (TRIGDMA) | 1.4595 | max. 10 |
| Tetraethylene glycol dimethacrylate (TEGDMA) | 1.4609 | max. 10 |
| Bis-phenol-A dimethacrylate | 1.5412 | 1600 ± 20% |
| 1.6-Hexandiol dimethacrylate (HDDMA) | — | max. 10 |
| Trimethylolpropane trimethacrylate (TMPTMA) | 1.4700 (25° C.) | 35 ± 20% |
| Pentaerythritol tetramethacrylate | solid | M.P. 52-55° C. |

TABLE II

| Monomers or mixtures (% by weight) | | Index "n_D20" | Viscosity cP |
|---|---|---|---|
| Trimethylol-propane triacrylate | (100) | 1.4740 | 75 ± 15 |
| Pentaerythritol triacrylate | (50) | | |
| Diethylene-glycol diacrylate | (50) | 1.4742 | 70 ± 15 |
| UCAR-X 118 | (49,2) | | |
| Diethylene-glycol diacrylate | (50,8) | 1.4748 | 290 ± 10 |
| UCAR-X 118 | (11,0) | | |
| Diethylene-glycol diacrylate | (89.0) | 1.4670 | max. 30 |
| UCAR-X 118 | (18) | | |
| Diethylene-glycol diacrylate | (82) | 1.4670 | 45 ± 5 |
| EBECRYL-600 | (33,3) | | |
| Diethylene-glycol diacrylate | (66,6) | 1.4915 | 75 ± 5 |
| EBERCRYL-600 | (16,7) | | |
| Diethylene-glycol diacrylate | (83,3) | 1.4765 | max. 30 |
| EBECRYL-830 | (33,3) | | |
| Diethylene-glycol diacrylate | (66,6) | 1.4742 | 65 ± 5 |
| SETAROL 3625 | (16,7) | | |
| Diethylene-glycol diacrylate | (83,3) | 1.4735 | 100 ± 10 |
| Methyl methacrylate | (38,46) | | |
| Pentaerythritol triacrylate | (38,46) | | |
| EBECRYL 600 | (23,08) | 1.4732 | max 30 |

There is further noted that, especially for some applications to be described hereinafter, the adhesion of the film toward glass substrates should preferably be weak or nil and, in such cases, the mixture of photopolymerizable monomers will include no hydrophilic monomer such as acrylic acid or glycol acrylates and methacrylates.

As photopolymerization initiators, there can be used in the present composition most substances generally suitable for this purpose and being compatible with the contemplated monomers and fillers. For example, the following photo-initiators suitable for the present invention can be: benzophenone, Mischler's ketone, ethyl 4-dimethylamino benzoate, benzil, 2-ethylanthraquinone, diethoxyacetophenone, (DEAP, Union Carbide) UVECRYL P-36 (U.C.B.), IRGACURE-651 (Ciba), SANDORAY-1000 (Sandoz), FI-4 (Eastman Kodak), VICURE-10 and -30 (Stauffer Chemicals), TRIGONAL-14 and P-1 (Noury), UV-HÄRTER Nos 1173 and 1116 (Merck), 2-chlorothioxanthone, etc. Using diethoxyacetophenone is appreciated as, being a liquid, it dissolves particularly well in the present photopolymerizable composition. Another excellent photoinitiator is UV-HÄRTER No. 1116 (Merck). Generally, there can be used advantageously from 0.5 to 5% by weight of the photo-initiator depending on the selected mixture, on the amount of filler and on the polymerization rates which are desired. Using 1 to 2% by weight of diacetophenone or other initiators is advantageous.

The nature of the radical R which intervenes in the formulae (I) and (II) can be much varied and its range is essentially dictated by the requirement of mutual compatibility with the organic phase components. In general, alkyl, alkenyl, cycloalkyl and cycloalkenyl of about 1 to about 12 carbon atoms are suitable, provided of course that the total number of C's in (I) or (II) is 4 or more, i.e. for instance, if only one organic radical per grafting site is involved, then it should be at least a four carbon radical while if more than one organic radical are involved, say three for instance, two of such radicals can be methyl and the third be ethyl or the like. The organic radicals can be unsubstituted or substituted with functions containing oxygen or heteroatoms (N, S, etc.). Oxygen functions can be hydroxy, keto, ester, ether functions and the like. Unsubstituted radicals can include photopolymerizable functions that will participate to the overall photopolymerization of the composition and provide thus photo-copolymers in which some of the copolymerized groups will actually bond to the silica particles by virtue of the fact that the photopolymerizable R was included in the compounds of formulae (I) or (II) for grafting to said silica particles. Other definitions for the R radicals will appear from further details hereinafter. Preferably, for optimal properties of the scratch-resistant coatings of this invention, the weight of the organic substituents used for grafting the silica particles relative to the weight of the SiO$_2$ of said particles will be at least 20% and can be more.

The methods which can be advantageously used for rendering organophilic the particles of the mineral fillers that are incorporated into the composition of the invention are selected among the known methods the references of which are listed in the introduction. Among these methods, the four methods (A to D) described hereinafter suit the invention to various extents. In the following schemes the sign

represents one of the peripheral silicon atoms (with a silanol function) of a hygrophilic silica particle which is to be made hydrophobic. It will remain understood that the free Si bonds represented in the schemes mean that this Si atom is bonded to the general polysilicic acid network of the particle as follows:

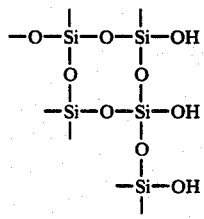

It should be further remarked that the particles of silica thus treated, even the smallest, each have a relatively large number of oxygen and silicon atoms. For instance, a particle of 0.02$\mu$ diameter has a weight of about $10^{-17}$ g assuming a value of 2.3 for the average density which corresponds to about $10^{-18/6}$ mole of SiO$_2$. Since the number of molecules in a mole is $6.10^{23}$, said particle will have about $10^5$ atoms of Si. The particles are therefore aggregates of relatively high molecular weight and the mixtures therefrom in liquid media are indeed micellar dispersions or colloidal solutions and not true solutions of organo-silicon compounds as in the majority of prior-art compositions mentioned hereinbefore. It is thus all the more remarkable that the composition of the invention does provide, in the case of silica particles, transparent films even with very high levels of such mineral fillers.

In the case of alumina particles, the above discussion will apply by analogy since peripheral alumina molecules also bear reactive OH functions.

The grafting methods which were experimented in the scope of the invention are listed below schematically. They are given for illustration and evidently they do not limit the invention as other method could be contemplated or even preferred as far as they may be more economical or more efficient.

A. The conversion of some OH functions of the mineral particles (silanol functions in the case of silica particles) into reactive functions; e.g. by chlorination as in the schemes below:

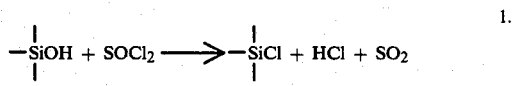

1.

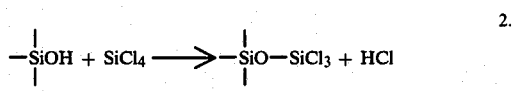

2.

Then alkylation of the invermediate product thus obtained:

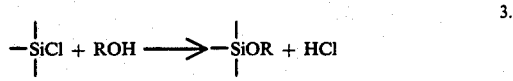

3.

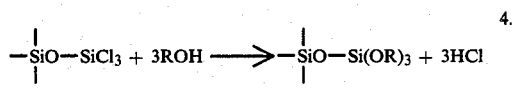

4.

B. A reaction with organosubstituted halogenosilanes:

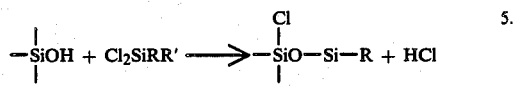

5.

Then alkylation of the silicon atom with elimination of the chlorine atom:

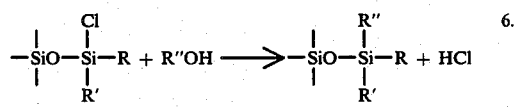

6.

In the above schemes, R' and R" (organic radicals) can be the same as R or be different from R. They can have (taken individually) less than four carbon atoms since for having the grafting conditions within the scope of the invention to be satisfied, it is sufficient to have only one of the organic substituents brought up during grafting at one site with at least four C atoms or, otherwise, the total of the carbon atoms of substituents R, R' and R" put together in accordance with the definition of the aforesaid formula (II) should be at least four.

C. The condensation promoted by heat with silanols (R—Si(OH)$_3$):

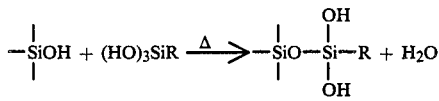
7.

It should be noted with regard to reaction 7 that the remaining OH functions can still react after grafting by further dehydration with other silanol molecules (chain extension by grafting) or with an OH on a neighbor Si atom in the polysilicic acid backbone of the particle under reaction (cross-link bridges). It should also be noted that the silanols used generally result from the hydrolysis of trialkoxysilanes according to reaction 8:

8. RSi(OMe)$_3$+3H$_2$O→RSi(OH)$_3$+3MeOH

D. A reaction of "physisorption" with trialkoxysilanes. This route is a "complexation" reaction providing a product in which the bonds to the silicon atom to be grafted are not covalent. It is carried out by boiling in an organic solvent like xylene:

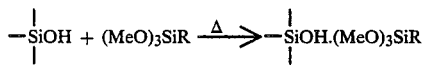
9.

It should be remarked that the "complex" thus obtained (electrostatic type of bonds) is not very stable and that a dispersion made from particles grafted as such has characteristics different from that of dispersions made from particles grafted by methods A to C above. In particular, dispersions obtained from particles treated according to 9 have a rheologic behavior that is sometimes non-Newtonian in character and are more difficult to use in the present composition.

In the above described grafting methods, the group R will preferably be a radical such as n-butyl, n-hexyl, n-heptyl, n-octyl, oleyl, 3-butenyl, decanyl, etc. Also functional groups are suitable that result from the use, when alkylating activated mineral particles, of glycol acrylates or methacrylates. Thus, in the substituent formulae R can be —(CH$_2$)$_n$OCO—CH=CH$_2$ where n can be for instance an integer between 1 and 6. When the group R has an olefinic moiety, that function can copolymerize with the other monomers of the composition when under irradiation, in which case the particles are then immobilized by chemical bonds within the coating organic matrix.

Grafting method C is preferred in the methods described hereinabove because it is relatively simple and because no halogenated intermediates are necessary, the handling and the disposal of which are undesirable regarding safety and environmental problems. Further, compounds of the formula R—Si(OR')$_3$ where R' is an easily hydrolyzable lower alkyl are commercially available, the range of the various usable R groups being relatively large.

For instance, the R with reactive functions can be the followings:

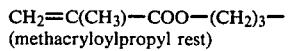
(methacryloylpropyl rest)

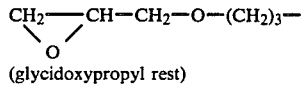
(glycidoxypropyl rest)

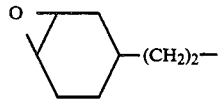
(3,4-epoxycyclohexyl-ethyl rest)

In the case where R contains a reactive function, such as the oxirane function as above, it is evident that the latter can contribute by its own polymerization reaction to the overall curing of the protective film of the invention.

On the practical aspect, for achieving the composition of the invention, the mineral particles made organophilic as mentioned above are dispersed into the photopolymerizable monomer or the mixture of monomers and the photoinitiator. This dispersion is carried out by usual means (blendor, ultra-sonics, mixer, ballmill, etc.) until the composition is well homogeneous. Then, after allowing the mixture to stand for enabling the air bubbles (or gas bubbles if the operation is done under an inert gas) to escape, it is applied to a substrate to be coated so as to form a thin film thereon. For this, standard tools and methods can be used such as brush, rod, doctor blade, spraying, dipping, etc. With regard to the protection of optical goods, lenses, mirrors, etc., the following procedure is preferably followed: on the surface to be protected, there is put a few drops of the photopolymerizable composition, after which there is applied thereon, in order to well spread it and make it even, a negative counter-plate or mold made of optical glass, the uncured protective layer being squeezed (and molded) between it and the good and consecutive spreading of the mixture taking place leading to the formation of a regular film over said good. The surface of the mold has a finish which is such as to confer well defined optical properties to the outside surface of the coating such properties being that, in fac-simile, of said mold (replica molding). After irradiation of the piece and photo setting of the coating, the mold is removed which step is effected with no effort as the adhesion between the mold and the film is weak or practically negligible. This unexpected result is due to the hydrophobic properties of the coating and of the particles therein; indeed, the monomers used are not hydrophilic (they contain no significant amount of hydrocompatible carboxylic or hydroxy groups such that of acrylic acid or the hydroxyacrylates) and also the mineral particles have no more affinity for the glass after being grafted with organic radicals as described above. In this connection, it should be said that if, instead of the composition of the invention, another composition were used having the same organic component but containing in lieu of 20–40% hydrophobic silica, only 2–3% of ordinary (non grafted) pyrogenic or precipitated silica, there is obtained a film that strongly adheres to a glass substrate so that it is difficult, if not impossible, to remove it therefrom.

With regard to photo-setting of the film on the substrate to be protected, usual means are employed, i.e. subjecting the film on the substrate to a suitable irradiation operation, such irradiation taking place either directly on the film or through a transparent layer applied over the coating (plastic membrane for avoiding dust falling on the fresh film or negative glass counter-form as described above). Also, the substrate can be turned up side down relative to the irradiation source, the exposure being done though the transparent body of the substrate itself if desired. As an irradiation source, one preferably uses a commercial type UV light giving fluxes of about 10-100 W/cm and suitable for photopolymerizing a film at a distance of 5-30 cm for a few seconds (2-60 sec) at room temperature. Other means and techniques for photopolymerization known to those skilled in the art may be used in photocuring the coating. Examples may be found in Swiss Patent Application No. 10191/79-6.

The photopolymerized film thus obtained is in form of a thin smooth layer perfectly transparent in the case when hydrophobic silica is present and translucent if hydrophobic alumina is present. When clear, this thin layer does not significantly modify the optical properties of the substrate and it offers an exceptional resistance to abrasion, weathering and accidental abuses as seen hereinafter in the special part of this disclosure. It can thus be used advantageously for coating optical apparatus lenses made of organic glasses such as PVC, polycarbonates and polymethacrylates as well as many other transparent articles such as clear panels, headlights and other lighting appliances in automotive or still equipment.

In summary, the resulting advantages from embodying the present invention are as listed below:

(a) Thin layers (from about 0.5 to 20 or 50 μm), smooth, transparent (with $SiO_2$) and very resistant to wear by abrasion (the composition of the invention lends itself however to the preparation of thicker layers in special cases).

(b) Solventless compositions requiring no evaporation step when curing the coating. The absence of solvents also removes the risks that the substrate be attacked (organic glass) by such solvents.

(c) Very quick hardening of the film at room temperature which is technically and economically advantageous, the production rate being high and the risks of damaging the coating before curing being strongly reduced.

(d) Low cost of the raw materials by virtue of the fact that the mineral fillers and the monomers are easily available and relatively cheap and that the fillers load percent is quite high.

(e) Excellent physical properties such as abrasion resistance and very low friction index. This last property is mostly unexpected in connection with such a high proportion of mineral filler and constitutes a highly surprising element of the present invention.

(f) Simple application techniques and well experimented and economical implementation methods, non-standard equipment being unnecessary.

The coatings of the invention as far as described up to now contain no stabilizers against weathering and against degradation by daylight exposure. If such stabilizers (a description of which will be found hereinafter in section II) are incorporated in the composition of the invention at concentration of about 0.5 to 5% by weight of composition, the resistance against oxidation, discoloration and other damages caused by external exposure conditions is greatly increased. This will be described in section II of this disclosure.

There will be now described in detail in the experimental part that follows how the invention can be put to application practically.

Reduction to practice of the invention

1. Preparation of hydrophobic silica and alumina

A. Chlorination of silica then alkylation of the chlorinated product:

In a 1 liter flask were placed 500 ml of anhydrous benzene, 240 ml of thionyl chloride and 30 g of pyrogenic silica (AEROSIL-380). The mixture was refluxed for 5 hrs after which the solvent and excess of $SOCl_2$ were distilled off. The residue was further left for 2 hrs at 50° C. under 10 Torr (13.3 mbar) so as to complete the evaporation and 31.3 g of chlorinated silica were collected. Ten g of this were then alkylated by boiling 2 hrs with 60 g of n-butanol (actually, temperatures of 60°-90° C. were already sufficient for 2 hrs reaction periods). The HCl formed was removed under reduced pressure (20-28 mbar) and an excess of dry ether was added. The suspension was centrifugated and, after separating the liquid phase, the solid was washed twice with ether. There were thus obtained 11.1 g of silica the particles of which bore, grafted on the silicon atoms, O-n-Butyl rests.

The same procedure was followed but replacing in the above preparation the n-butanol by equivalents of the following alcohols: n-hexanol, n-heptanol, n-octanol, oleyl alcohol and 1,2-propanediol monoacrylate. There were thus obtained silica products with corresponding grafted substituents.

A'. Treating with tetrachlorosilane then alkylation of the obtained chlorinated product:

This reaction corresponds to the following scheme:

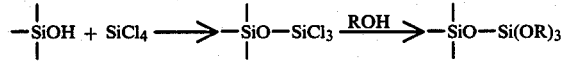

In a 1 liter flask there was boiled for 5 hrs a mixture of 500 ml of anhydrous benzene, 240 ml of $SiCl_4$ and 30 g of AEROSIL-380 (Degussa). Then, the solvent and the excess $SiCl_4$ were distilled off and evaporation was completed by heating 2 hrs at 50° C. under 14 mbar for fully removing volatile materials. Then 70 g of n-decanol were added to 10 g of the silica thus modified and, after 2-3 hrs at 70°-90° C., the pressure was dropped to 20-30 mbar for completely expelling the HCl formed. After cooling, ether was added as described before (see under part A) and the product was centrifugated and washed twice with ether. After drying in air 10.7 g of grafted silica were collected.

With n-hexyl and oleyl alcohols, corresponding results were obtained.

B. Reaction with chlorosilanes:

Twenty five g of AEROSIL-380 were heated to reflux for 5 hrs with 500 ml of anhydrous chloroform and 25 ml of trichlorovinylsilane or dichloromethylvinylsilane. Then, the solvents and excess volatile reagents were evaporated under vacuum. Alkylation of the residue was achieved by heating for 2 hrs with 200 ml of ethanol. Then the reaction mixture was centrifugated and the residue was purified by extracting with ether (5 hrs). This method provided a grafted silica of excellent whiteness. Analogous results were obtained by replacing trichlorovinylsilane by trichloromethylsilane.

C. Condensation with silanols:

Forty g of γ-methacryloxypropyl-trimethoxysilane (product A-174, Union Carbide) were stirred at room temperature in one liter of water acidified with dilute acetic acid to pH 3.5. An emulsion which first appeared in the flask dissolved progressively during hydrolysis. After 1–2 hrs stirring, there were added, when the solution became clear, 40 g of silica aerosil 380 and the mixture was stirred for an additional 15 hrs at room temperature. The suspension which had become thicker with time was centrifugated and the solid was dried overnight at 80°–100° C. under vacuum. Then the modified silica was milled in a Waring blendor and heated another 2 hrs at 110° C. under 14–20 mbar in order to complete dehydration and condensation of the remaining free silanol groups of the grafts with neighbour silanol groups of the particle network. The organic content of the grafted silica was determined thermogravimetrically to be 33 parts by weight of organic matter for 100 ppw of silica, i.e. 33%.

This grafting process is the preferred method in the present invention. It was used successfully to provide organophilic silica from the following grades: AEROSIL 130, 200, 300, 380 and CAB-O-SIL M-5 and H-5. By this method, 40 g of starting silica furnished 54–57 g of silica grafted with oxy-silico-γ-methacryloxypropyl groups. The organic content of said grafted silica lots varied between about 25% and 33%.

In the above preparation, the following trialkoxysilanes were also used: γ-methacryloxypropyl-ethoxy-dimethoxysilane (No. A-175, Union Carbide); γ-glycidoxypropyl-trimethoxysilane (No. A-187, Union Carbide); (3,4-epoxy-cyclohexyl)-ethyl-trimethoxysilane (No. A-186, Union Carbide); isobutyl-trimethoxysilane (DYNASILANE, IBIMO) and octyl-triethoxysilane (DYNASILANE, OCTEO).

D. "Physisorption" with trialkoxysilanes.

In a 1 liter flask, there was heated 5 hrs to the boil a mixture of pyrogenic silica (Aerosil 380) (25 g), A-174 (Union Carbide) (25 ml) and anhydrous xylene (500 ml). The mixture was centrifugated and the solid residue was taken into fresh xylene and again centrifugated. After repeating once more such purification step, the resulting powder was collected and dried in air.

The above procedure was also carried out with the following trialkoxysilane products (defined above): A-175, A-186 and A-187, as well as with γ-aminopropyltriethoxysilane (A-1100) all from Union Carbide. Results were similar except for the color of the treated silica (brown with A-175 and pale yellow with A-1100). The other modified silicas were colorless.

A sample of silica modified with A-174 (methycryloxypropyl group) (10 g) was mixed with 3 g of methyl methacrylate, 60 g of xylene and 0.05 g of lauroyl peroxide after which the mixture was refluxed for 4 hrs. Thereafter, the doubly modified silica was purified by successively centrifugating with xylene three times.

2. Preparation of compositions according to the invention

A. By means of silica grafted by chlorination and alkylation.

There were used several types of organophilic silica obtained according to the procedure described hereinbefore under paragraph 1.A. which were dispersed as indicated in the first part of this specification, to various solid concentrations into trimethylol-propane triacrylate (TMPTA) containing 2% of diethoxyacetophenone (DEAP). Compositions having different viscosities were obtained the rheological properties of which were either Newtonian or thixotropic depending on the cases. The data about such compositions are gathered in Table III below. In this Table, the following data are provided: the type of alkylating alcohol used, the concentration of the silica in parts by weight relative to the TMPTA (the total of the parts being 100), the refraction index of the organic mixture of the compositions, the viscosities and the rheological properties.

TABLE III

| Composition No. | alcohol | Silica (A-380) (parts by weight) | "$n_D 20$" | Viscosity cP | Properties |
|---|---|---|---|---|---|
| 1 | Butanol | 20 | 1.4705 | 670–710 | Thixotropic |
| 2 | Heptanol | 20 | 1.4691 | 340–360 | Newtonian |
| 3 | Glycidyl acrylate | 20 | — | — | Thixotropic |
| 4 | Octanol | 20 | — | — | Thixotropic |
| 5 | Decanol | 20 | — | — | Thixotropic |
| 6 | Hexanol | 16 | 1.4708 | 240–250 | Newtonian |
| 7 | " | 20 | 1.4701 | 320–325 | Newtonian |
| 8 | " | 25 | — | 810–950 | Fluid |
| 9 | " | 27 | — | 950–1450 | Fluid |

Table IV gives indications similar to that of Table III regarding silica activated by SiCl4 then alkylated by method A' or by means of silica grafted with tetrachlorosilane then alkylation of the chlorinated intermediate.

TABLE IV

| Composition no. | alcohol | Silica (A-380) (parts by weight) | "$n_D 20$" | Viscosity (cP) | Properties |
|---|---|---|---|---|---|
| 1 | Decanol | 16 | 1.4715 | 830–930 | Fluid |
| 2 | Oleyl alcohol | 13 | — | — | Thixotropic |

B. By means of silica grafted with chlorosilanes then alkylation of the chlorinated intermediate.

There was proceeded as disclosed in paragraph 2.A. and compositions were prepared by mixing various lots of silica (made hydrophobic by method 1.B.) in TMPTA with 2% DEAP. Table V summarizes the tested compositions and indicates, in turn, the type of chlorosilane used for modifying the silica, the alkylating alcohol, the levels of silica fillers in the compositions, the refraction index, viscosities and properties of the compositions.

TABLE V

| Composition No. | Chlorosilanes | Alcohol | Silica (parts by weight) | "n 20" | Viscosity (cP) | Properties |
|---|---|---|---|---|---|---|
| 1 | trichlorovinyl silane | ethanol | A 380 (40) | 1.4525 | 260–270 | Fluid |
| 2 | trichlorovinyl silane | ethanol + water | A 380 (33) | 1.4634 | 1150–1490 | Fluid |
| 3 | trichlorovinyl silane | ethanol + water | A 200 (18,4) | 1.4730 | 1150–1600 | Fluid |
| 4 | dichloromethyl vinyl silane | ethanol | A 380 (20) | 1.4636 | 240–280 | Fluid |

C. Silica treated by condensing with silanols:

Several types of silica were used and made organophilic by the method described above under paragraph 1C. with hydrolyzed γ-methacryloxypropyl-trimethoxysilane (A-174). Table VI hereinafter summarizes the various parameters relative to such compositions and indicates the type of monomer or monomer mixture used, the amount of silica filler in parts by weight (the total of said parts and the parts of monomers being 100 parts), the refraction index "n" and the rheological properties of the compositions which also contained 2% by weight of diethoxyacetophenone photoinitiator. The three first compositions of this Table distinguish themselves from each other by the hydrophilic modification conditions: composition 1 contains a silica treated with a 1 percent aqueous solution of a-174, composition 2 contains a silica treated with a 4 percent aqueous solution of a-174 after 18 hours of hydrolysis, and composition 3 a similarly treated silica except that hydrolysis was for only 20 min.

TABLE VI

| Composition no | Monomer or mixture | Silica type (parts by weight) | "$n_D 20$" | Viscosity (cP) | Properties |
|---|---|---|---|---|---|
| 1 | TMPTA | A-380 (20) | 1.4735 | — | Thixotropic |
| 2 | " | A-380 (20) | 1.4740 | 530–535 | Newtonian |
| 3 | " | A-380 (20) | 1.4739 | 990–1040 | Newtonian |
| 4 | " | A-300 (20) | 1.4738 | 445–445 | Newtonian |
| 5 | " | A-200 (20) | 1.4739 | 570–590 | Newtonian |
| 6 | " | H-5 (20) | 1.4738 | 425–440 | Newtonian |
| 7 | " | M-5 (20) | 1.4736 | 520–570 | Newtonian |
| 8 | " | H-5 (28.5) | 1.4758 | 1020–1050 | Newtonian |
| 9 | UCAR X-118 (49.2) DEGDA (50.8) | H-5 (13.6) | 1.4748 | — | Pseudoplastic |
| 10 | UCAR X-118 (18) DEGDA (82) | H-5 (20) | 1.4698 | 230–228 | Newtonian |
| 11 | UCAR X-118 (11) | H-5 (20) | 1.4682 | 150–155 | Newtonian |
| 12 | DEGDA (89) EBDCRYL-830 (33.3) DEGDA (66.7) | H-5 (20) | 1.4745 | 430–450 | Newtonian |
| 13 | EBECRYL-600 (16.7) | H-5 (20) | 1.4762 | 210–215 | Newtonian |
| 14 | DEGDA (83.3) Methylmethacrylate (38.5) PETEA (38.5) EBECRYL-600 (23) | H-5 (20) | 1.4755 | 140 | Newtonian |
| 15 | Methylmethacrylate | H-5 (43.7) | — | — | Very fluid and Newtonian |
| 16 | Butylacrylate | H-5 (43.7) | — | — | Very fluid and Newtonian |

D. Silica grafted by "physisorption":

Preparation of the corresponding composition was carried out exactly as for the previous compositions of Tables III to VI. The various parameters pertaining to these compositions are grouped in Table VII hereinafter. These parameters comprise, in turn, the types of organosilanes used for the "physisorption", the amount of silica (A-380) used in the compositions (parts by weight in relation to the weight of the organic matter, the total of the ingredients being 100 parts), the types of monomers or mixtures of monomers used, the refraction index "n", the viscosity of the mixture and its rheological behavior. All the compositions also contained 2% by weight of diethoxyacetophenone as the photoinitiator.

The four first compositions of Table VII differ from each other by the following points: In the first (No. 1), silica has been made organophilic simply by the indicated treatment (all the other samples starting from the fifth were also treated likely). Composition No. 2 contains silica which, after physisorption, was subjected to a second activating modification by thermal copolymerization with methyl methacrylate as indicated in the last paragraph of section 1.D. hereinabove. Compositions 3 and 4 contained silica products that were similarly doubly modified with the A-174 monomer and butyl acrylate, respectively.

TABLE VII

| Composition no. | Silane used | Silica (parts by weight) | Monomers used (%) | "$n_D 20$" | Viscosity (cP) | Properties |
|---|---|---|---|---|---|---|
| 1 | A-174 | 20 | TEPTA | 1.4730 | 650–800 | Fluid |
| 2 | " | " | " | 1.4774 | 1100–1200 | Fluid |
| 3 | " | " | " | 1.4742 | 2000–2400 | Fluid |
| 4 | " | " | " | 1.4750 | 2250–2750 | Fluid |
| 5 | " | " | HDDA | 1.4595 | 205–207 | Newtonian |
| 6 | " | " | DEGDA | 1.4684 | 205–210 | Newtonian |
| 7 | " | " | DEGDA(50) PETRIA(50) | 1.4732 | 510–570 | Fluid |
| 8 | " | 24.5 | DEGDA(50) PETRIA(50) | 1.4732 | 800–900 | Fluid |
| 9 | A-174 1% SOCl | +17 | TMPTA | — | — | Thixotropic |
| 10 | A-175 | 20 | " | 1.4734 | 1300–1700 | — |
| 11 | A-1120 | 20 | " | 1.4775 | — | Thixotropic |

Compositions represented in Tables III to VII have, depending on the cases, a Newtonian (fluid) or thixotropic behavior. For embodying the invention, composition with newtonian properties are preferred since they more easily form thin films with well controlled characteristics. Generally, the smaller the silica particles (or alumina particles) and the greater the organophilic properties thereof (in proportion to the degree of grafting and to the length and the number of carbon atoms of the grafted radicals), the more the composition will behave as a Newtonian liquid and the easier it can be handled. Moreover, the overall viscosity of the compositions increases with increasing size of the particles and increasing solid concentration in the mixture.

With respect to the clarity of the compositions containing organophilic silica, it is advantageous to use mixtures of monomers with an index of refraction as near as possible to that of said silica. It should be pointed out in this connection that the organophilic modifying treatments used in this invention do not necessarily lead to silica products with every time the same refraction index. However, this index remains most of the time reasonably close to the 1.4740–1.4750 range. Thus, it may happen to be useful to adapt, from case to case, the refraction of the organic mixture to that of the selected silica. In this regard, it is reminded that if the difference between the indices (that of the organic phase and that of the silica) becomes too great, the composition becomes milky and the coatings obtained therefrom are not perfectly clear. Quantitatively speaking, if one uses 20 parts by weight of organophilic silica (n=1.4746) with 80 parts by weight of TMPTA (n=1.4732) or a 1:1 mixture of PETIA and DEGDA (n=1.4746), one obtains a clear mixture. Contrariwise, in the same conditions but with either pure HDDA (n=1.4574) or DEGDA (1.4621), translucent mixture will be obtained.

The results in table VIIa below obtained with the use of a silica, a-972, treated with a silicone coating compound containing less than four carbon atoms show that this silica treatment does not give satisfactory coating application behavior, even with low silica loading.

TABLE VIIa

| Composition no. | Concentration of a-972 | polymer | viscosity and observations |
|---|---|---|---|
| 12 | 11 | tmpta 89 | strongly thixotropic mass |
| 121 | 8 | tmpta 92 | 550–840, liquid, developed thixothogy after storage for a day |
| 35 | 7.4 | degda 92.6 | 195–205, n d 20 1.4615 slowly developed thixotropic properties |

3. Compositions with alumina

If, in the various methods for treating silica described until now and in the methods for preparing the coating compositions of the present invention with said organophilic particles, the silica particles are replaced by alumina of equivalent mesh size, similar results are experienced except for the transparency parameter as already explained.

4. Obtention of abrasion resisting coatings

For the coating experiments, organic glass plates (2×10 cm) were used namely of polymethylmethacrylate (PMMa), polycarbonate (PC), polyvinyl chloride (PVC) and CR-39 ® (poly(diethyleneglycol)-bis-allylcarbonate). The plates were first washed with isopropanol, then, thin layers (thickness 1 to 50 μm) of the compositions listed in Tables III to VII were applied on the plates by the means already mentioned hereinbefore. Then, the samples were irradiated with a 80 w/cm UV source for periods of 5 to 30 sec or more. Best optical properties were obtained by pressing on the freshly coated plates a perfectly smooth glass plate, i.e. by performing a "replica molding" of the coating by means of a glass mold. In this case, the exposure is done through the glass, the latter being eventually easily detached from the hardened film after cooling.

5. Measurements of the optical properties

The optical properties of the coatings (obtained by "replica molding" as above) from the various compositions listed in Tables III to VII were measured. Coatings with about 15–25 μm thickness were selected. The measured parameters were the percent transmission and reflectance (relative to a corresponding non-coated plate) between 800 and 400 nm with a PYE-UNICAM spectrophotometer. Results are provided in the following Tables: Table VIII for the PC substrates (MAKROLON ®); Table IX for the PMMa substrates (PLEXIGLAS ®) and Table X for the PVC substrates (TAKIRON ®). In the tables, there are provided, successively, the following data: a control sample uncoated, then samples identified by the number given to the corresponding composition from Tables III to VII, the % of transmission at 800, 590 and 400 nm for said coatings (plus the substrate), respectively, and the gain or the loss relative to said control sample.

TABLE VIII

| Composition | Transmission (%) at nm | | | Gain or loss (%) |
|---|---|---|---|---|
| No. | 800 | 590 | 400 | at 590 nm |
| Control (MAKROLON) | 89.7 | 86.5 | 74.4 | 0 |
| III 2 | 92.2 | 86.6 | 76.8 | +0.35 |
| III 5 | 91.5 | 88.2 | 76.8 | +1.96 |
| III 6 | 94.2 | 87.5 | 73.4 | +1.16 |
| VI 2 | 89.7 | 86.7 | 74.4 | +0.02 |
| VI 3 | 89.5 | 86.5 | 73 | 0 |
| VII 1 | 93.4 | 86.4 | 76.8 | −0.01 |
| VII 7 | 88.2 | 84.2 | 70.0 | −2.54 |

Table IX further lists a sample, X, coated with a translucent film containing alumina. This film was prepared with a composition containing TMPTA and 16 parts by weight of $Al_2O_3$ (total 100 p.b.w.), the latter having been made organophilic by the process disclosed under section A.1.+hexanol (analogy with composition III-6); viscosity: 255–277 cP. A similar behavior was observed for a corresponding sample containing silica activated by the process described under section C.

TABLE IX

| Composition | Transmission (%) at nm | | | Loss (%) at nm |
|---|---|---|---|---|
| No. | 400 | 590 | 800 | 590 |
| Control (PLEXIGLAS) | 93.2 | 91.7 | 88.2 | 0 |
| III 2 | 93.5 | 91.0 | 85.5 | 0.76 |
| III 5 | 93.2 | 90.4 | 84.5 | 1.4 |
| III 6 | 93.2 | 91.0 | 87.0 | 0.76 |
| VI 2 | 92.0 | 89.7 | 83.5 | 2.18 |
| VI 3 | 90.0 | 87.0 | 79.0 | 5.12 |
| VII 1 | 91.8 | 89.5 | 84.0 | 2.4 |
| VII 5 | 91.0 | 88.0 | 83.5 | 4.03 |
| VII 6 | 88.5 | 84.5 | 76.0 | 7.85 |
| VII 7 | 92.8 | 89.5 | 84.0 | 2.40 |
| X ($Al_2O_3$) | 75.0 | 66.5 | 49.5 | 27.5 |

TABLE X

| Composition No. | Transmission (%) at 590 nm | Gain or loss (%) |
|---|---|---|
| Control PVC TAKIRON ® | 83.2–83.3 | 0 |
| VI 2 | 83.3–83.9 | +0.6 |
| VI 4 | 82.5–82.6 | −0.6 |
| VI 5 | 84.1–84.2 | +0.7 |
| VI 6 | 83.6–83.7 | +0.4 |
| VI 7 | 83.3–83.4 | +0.1 |

It is interesting to note from the results of Tables VIII and IX that the clarity of the coatings containing silica rendered organophilic by "chemisorption", i.e. by the techniques described in sections A to C is better than the clarity of the coating containing silica modified by "Physisorption".

6. Measurements of abrasion resistance

For the abrasion resistance measurements, the same plates were used which are described in Section 4 with a protective coating according to the invention. The abrading device (Creusot-Loire Instrumentation, Adamel-Lhomargy, France) comprised a rubbing shoe (1×1 cm; 2 kg) moving alternatively forward and backward on the sample by means of a crankdrive and the rubbing surface of which was provided (stuck with tape) with a patch of steel wool (Tampon GEX). The operating parameters of this testing were: displacement amplitude: 4 cm; frequency: 1.4 HZ; number of cycles: up to 500. Table XI provides the results obtained for samples of polycarbonate (MAKROLON ®), PMMa (PLEXIGLAS ®), CR-39 ® (PPG), Polyurethane (SECURIFLEX ® of St. Gobain) and FLOAT glass as well as for the coatings of the invention applied on some of the above substrates (thicknesses 5–20 um). The abrasion effect is expressed as the loss of optical transmission (loss of gloss) after a number of abrading cycles.

TABLE XI

| Coated sample or substrate | Coating composition No. | Cycles number of | Loss of transmission at 590 nm (%) |
|---|---|---|---|
| MAKROLON ® (1 mm) | — | 0 | 0.0 |
| " | — | 100 | 34.1 |
| " | III 2,5 and 6 | " | 0.67 |
| " | VI 2 and 3 | " | 0.67 |
| " | VII 1 and 7 | " | 0.67 |
| " | X (Al₂O₃) | " | 0.0 |
| PLEXIGLAS ® (1 mm) | — | 0 | 0.0 |
| " | — | 50 | 29.0 |
| " | — | 100 | 32.9 |
| " | III 2 | " | 0.52 |
| " | III 5 | " | 0.67 |
| " | VI 2 | " | 0.52 |
| " | VI 9 | " | 8.0 |
| " | VI 10 | " | 1.0 |
| " | VI 11 | " | 0.6 |
| " | VI 12 | " | 0.5 |
| " | VI 13 | " | 1.7 |
| " | X (Al₂O₃) | " | 0.0 |
| " | VII 1,5 and 6 | " | 0.52 |
| " | VII 7 | " | 0.57 |
| PLEXIGLAS ® (1 mm) | III 2 | 500 | 0.80 |
| " | III 5 | 500 | 0.80 |
| " | VI 2 | 500 | 0.80 |
| SECURIFLEX ® | — | 0 | 0.0 |
| " | — | 100 | 5.4 |
| " | — | 200 | 9.1 |
| CR-39 ® PPG | — | 0 | 0.0 |
| " | — | 50 | 7.8 |
| " | — | 100 | 8.9 |
| " | — | 200 | 10.8 |
| Glass (1 mm) | — | 100 | 0.0 |

The results of Table XI show that, with the exception of composition VI-9, all coatings according to the invention provide an excellent protection against scratches. The protection offered by the coating containing alumina (sample X Al₂O₃) is even better since no optical transmission loss was evidenced after 100 rubbing cycles. However, account should be taken that silica hardness is only 820 Knoop whereas that of alumina is 2,100 Knoop.

7. Resistance to corrosion by organic solvents

For testing the resistance of the present coatings to solvent attack, the steel wool used in the device of the previous test was replaced with a porous plug soaked in the solvent to be tried. After 100 rubbing cycles, the possible transmission loss of the sample was compared to that of the same coating sample not subjected to an attack by the solvent. The following solvents were tried and none had any effect on a PLEXIGLAS ® sample protected by films from the compositions III-2 and 5, VI-2 and VII-1, 5, 6 and 7. In contrast, a naked PLEXIGLAS ® plate suffered a 47.6% loss under the same conditions when subjected to chloroform. Solvents tried: heptane/toluene (70/30); toluene, acetone chloroform; tetrachloroethylene/trichloroethylene (60/40); heptane/trichlorethylene/toluene (15/50/35).

8. Resistance to surfactants solutions

Samples to be tested were immersed for variable periods into 1% aqueous TEEPOL ® (an alkyl-aryl-sulfonate) at 20°–30° C., then they were left to dry in air after which they were cleaned with a moist cloth. It was noted that the same samples mentioned above under section 7 had only a 0.8% optical transmission loss after 864 hrs of immersion and that the films had no tendency to loosen from the support.

9. Resistance to heat

For this test, the sample is subjected to conditions reproducing normal operating conditions for vehicle head-lights cover glasses: 1 day in a moist atmosphere at 18°–28° C. and 16 hrs in a dry atmosphere at 115° C. In the present case a polycarbonate projector glass (type E-2, SEV Marchal) was protected with a film from composition VII-1. After 16 hrs in the oven at 115° C. the coating was not cracked, nor flaked off and had no visible deformation.

10. Resistance to shock

A steel ball (13.6 g, φ15 mm) was dropped from a height of 9 m on a projector glass protected as described in the previous section. The velocity at the hitting point was 13.28 m/sec. After the shock, the coating did not crack or peel off (composition VII-1).

11. Resistance to weathering

A photopolymerizable anti-abrasive composition was prepared by mixing together 333 parts of EBECRYL ® 220 (see Table I) and 666 parts of diethylene glycol diacrylate (DEGDA). To this mixture were added, and all ingredients were milled together overnight in a glass jar with glass beads, variable amounts of grafted silica (prepared according to the method described under section 1.C), variable amounts of a photo-initiator (UV-HÄrter-1116 from Merck) and variable quantities of a range of UV stabilizers. Such stabilizers were selected from commercially available stabilizers as listed below: the TINUVIN ® stabilizers made by the CIBA-GEIGY Company and including the TINUVIN ®-900, -P,-328. The UVINUL ® stabilizers sold by the BASF-Wyandotte Company; the UVINUL stabilizers are mostly benzophenone derivatives and are detailed in a Data sheet from the BASF WYANDOTTE CORP., Parsippany, N.J. 07054 called "UVINUL ® UV Absorbers for cosmetics, Plastics, Coatings and Textiles". The absorbers tested included the following types of UVINUL ®: N-539; D-49. Phenyl salicylate was also included in the UV absorbers tested. The respective quantities of grafted silica, photo-initiator and the various stabilizers are given in % by weight with respect to the above composition.

After filtering the composition on a nickel mesh (25μ), films of such compositions (10–50μ thick) were applied on standard polycarbonate plates (7.5×15 cm) and irradiated with a 60 W/cm UV light source placed 30 cm from the film. During irradiation, a 4 mm thick glass plate was interposed between the source and the sample plates to evenly distribute the light energy. Irradiation times were 30 sec ($T_1$) and 60 sec ($T_2$).

The coated samples were then subjected to an accelerated weathering test in a "Q-UV accelerated Weathering Tester (the Q-Panel Company, Cleveland OHIO). This test consists in subjecting the samples to very strong UV irradiation from fluorescent UV lamps under alternating conditions of dry and humid heat (1 cycle=8 hrs under UV at 70° C. dry followed by 4 hrs UV at 50° C. under condensating humidity conditions 100% relative humidity). After intervals, the samples were examined for the advent or formation of crazing (cracks), dewetting (separation of the film from substrate), chalking and other general degradation signs. The "cross-hatch" testing was applied to determine the residual adhesion of the film over the substrate. This test consists in cross-cutting the film at right angles with a sharp knife so as to provide criss-cross stripes about 1 mm wide thus defining a plurality of little film squares like a chequer board; then a piece of scotch adhesive tape is pressed over the test area and thereafter lifted whereby some of the little squares will be removed if adhesion of the film on the substrate is low. The conditions for passing the above weathering test were that no trace of any deficiency (in connection with the aforesaid criteria) is found; for instance, in the cross-hatch test, the lifting of even one of the little squares is failing.

In the weathering test none of the samples had failed at the end of the 168-hour exposure period. The first column of the weathering test data (table XII) shows an x for each coating that was rated failed at the end of the 336-hr. period, the second column similarly shows which coatings were rated failed at the end of the 504-hr. period, and the third column likewise shows those rated failed at the end of the 672-hr. period. Only one coating was considered to have passed the 672-hr test no. 658 gg't2. The other columns of the Table pertain to the other aforedescribed composition parameters.

TABLE XII

| Sample (No) Cure (T) | SiO₂ (%) | Photo-initiator (%) | Stabilizer type and (%) | Weathering test 1 | 2 | 3 |
|---|---|---|---|---|---|---|
| | | | TINUVIN ® 900 | | | |
| 658 c T1 | 20 | 1 | 0.5 | X | | |
| 658 c T2 | " | " | " | | X | |
| 658 d T2 | " | " | 1 | | X | |
| 658 T1 | " | 2 | 0.5 | | X | |
| 658 T2 | " | " | " | | X | |
| 658 a T1 | " | " | 1 | | X | |
| 658 a T2 | " | " | " | | X | |
| 658 b T1 | " | 4 | 0.5 | | X | |
| 658 b T2 | " | 4 | " | | X | |
| 658 kkT1 | 27.7 | 2 | " | | X | |
| 658 kkT2 | " | " | " | X | | |
| | | | UVINUL ® N-539 | | | |
| 658 bb'T2 | " | 1 | 1 | | X | |
| 658 cc'T2 | " | " | 2 | | X | |
| 658 aaT1 | " | 2 | 0.5 | | X | |
| 658 aaT2 | " | " | " | | X | |
| 658 bbT1 | " | " | 1 | | X | |
| 658 llT1 | 27.7 | " | 0.5 | X | | |
| 658 llT2 | " | " | " | X | | |
| 658 ll'T2 | " | " | 2 | | X | |
| | | | UVINUL ® N-539 | | | |
| 658 bbT2 | 20 | 2 | 1 | | | X |
| 658 ccT2 | " | " | 2 | | X | |
| 658 cc'T2 | " | " | 3 | | X | |
| 658 ddT1 | " | 4 | 1 | | X | |
| 658 ddT2 | " | " | 1 | | X | |
| 658 S T2 | 35 | 2 | 2 | X | | |
| 658 V T2 | 15 | " | " | | X | |
| 658 iiT2 | " | 1 | 1 | | | X |
| 658 eeT1 | " | 2 | 0.5 | | | X |
| 658 eeT2 | " | " | " | | X | |
| 658 ffT1 | " | " | 1 | | | X |
| 658 ffT2 | " | " | " | | | X |
| 658 ggT2 | " | " | 2 | | | X |
| 658 gg'T2 | " | " | 3 | | | * |
| 658 hhT1 | " | " | 1 | | | X |
| 658 hhT2 | " | " | " | | | X |
| 658 mmT1 | 27.7 | " | 0.5 | | X | |
| 658 mmT2 | " | " | " | X | | |
| 658 mm'T2 | " | " | 2 | | X | |
| | | | TINUVIN ®-P | | | |
| 658 p T2 | 20 | " | 2 | | X | |
| | | | TINUVIN ®-328 | | | |
| 658 g T2 | " | " | 2 | | X | |
| 658 r T2 | " | " | Phenyl salycylate 2 | | X | |
| 658 x1T2 | " | " | D-49/N-539 (1:1) 2 | | X | |
| 658 x2T2 | " | " | D-50/N-35 (1:1) 2 | | | X |
| | | | UVINUL ® M-401 | | | |
| 658 x3T2 | " | " | TIN ®-328 (1:) 2 | | | X |
| 658 x4T2 | " | " | TIN ®-P/Phenyl salicylate (1:1) 2 | | | X |

*Coating considered to have passed the 672 hrs test.

12. Comparative testings

Further testings were done with films (about 5μ to 30μ thick) of the composition disclosed in the previous Example deposited on polymethacrylate (PMMA) and polycarbonate (PC) organic glasses. The composition contained 20% by weight of the grafted silica, 2% of the photoinitiator (UV-Härter-1116) and 2% of a UVINUL ® weathering stabilizer. The tests to which the samples were submitted are listed below.

i: Adhesion after curing; cross-hatch scotch-tape test (technique and passing criteria were described in the previous Example), ii: Pencil hardness: pencil lines are drawn by hand on the sample by holding the pencil at 45° angle and pushing forward. Pencil hardness grades 2H to 9H. No mark should be visible for passing, iii: Flexion (GTB test): In this test, the sample (150×25 mm) is supported horizontally on two blocks (with rounded corners) separated by a distance of 125 mm. Then a force is applied in the center of the sample that produces a bending the central extent of which (relative to the horizontal) is measured. The 25 mm and 50 mm deformation are recorded in terms of the coating aspect after returning to horizontal i.e. the look for creases, crazing, peel-off, opalescence, etc. No such defect should be visible for passing.

iv: Heat resistance: the sample is heated in an oven for one hour at 115° C. Then surface examination is done as above.

v: Thermoforming: A coated plate sample (75×140 mm, 1 mm thick) is heated in an oven to its softening point (glass transition temperature), then it is bent until forming a cylinder with the opposite shorter edges touching. After cooling, the surface of the rigid cylinder is examined for any of the defects outlined under iii. No defect should be visible for passing.

vi: Scratch width (French standards): A flat sample is layed on the table and a diamond point with a 270 g load is fixedly applied on it by its own weight. The sample is then gently pulled so that the point will dig a groove in the sample surface the width of which is inversely proportional to the surface resistance to scratching. The width of the groove is recorded in $\mu$m.

vii: Taber abrasion test (ASTM): The test sample is placed on a horizontal turn-table and two free spinning flat edge abrasive rollers held on a fixed horizontal axle are applied on the sample in a manner such that, upon rotation of the table, the rollers will be driven to spin by friction with the sample surface. The rollers are loaded with a 500 g weight and since they are radially symmetrically disposed with regard to the turn-table center, they will provide an annular abraded zone on the sample after some time of operation. The number of cycles is 500 after which the loss of transparency of the abraded area is measured in an apparatus for measuring diffusion of light and expressed as a percent attenuation of visibility by diffusion.

viii: GTB abrasion test: In this test, a seven inch diameter organic glass lens protected by a scratch-resistant coating to be tested (such kind of lens is used in automotive light equipment) is subjected to rubbing with an alternatively moving shoe applying on the horizontally layed anti-scratch surface. The contact surface of the shoe is provided with a cloth dusted with quartz powder (UTAC powder). The load on the shoe is 2N/cm$^2$ and the number of rubbing cycles is 100. The abraded area is then examined for diffusion ($\Delta$D) and light transmission ($\Delta$T) as above. results are expressed in "digit units" being known that the lower the "digits" value, the more abrasion resistant the sample is ix: Water immersion test: The samples were immersed in 1% TEEPOL aqueous solution at 65° C. They were removed at intervals and tested for adhesion (cross-hatch). The number of hours before failure is recorded as the merit index in this test.

x: Accelerated weathering resistance: This is the Q-UV test described in the previous Example.

The aforedescribed tests were applied to the samples of the invention and, simultaneously, to samples of PC protected by a commercially available anti-scratch composition labelled GE/SHC-1000. The data pertaining to that comparable material and to the samples of the invention as well as the results to the aforementioned tests are recorded in TABLE XIII. In the middle column, the results are for both coated PMMA and PC unless separately mentioned.

TABLE XIII

| Data & Tests | Coatings of the invention | GE/SHC-1000 on PC |
|---|---|---|
| Composition before curing | | |
| resin content | 80% | 20% |
| solvent | none | methanol-isobutanol |
| flash-point | >130° C. | 26° C. (Penske-Markens) |
| density (g/cm$^3$) | 1.1–1.3 | 0.91 |
| pH | — | neutral to mildly alcaline |
| shelf-life | >6 months at 23° C. in the dark | 2 months at 4° C. |
| viscosity | 100–200 cP | 4–10 cStrokes |
| handling care | fluid (no vapor) | flammable liquid |
| toxicity | skin irritant | skin and eye irritant |
| Application procedure | | |
| primer | none | primer SHP-200 dip, flow or spay air drying 30 min |
| scratch resistant layer | spray, brush, roll, doctor blade replica coating | dip, flow, spray air drying 20 min |
| curing | 30–60 sec UV no heat | 60 min 120–125° C. |
| Film data | | |
| density | 1.2–1.5 g/cm | 1.45 g/cm$^3$ |
| thickness | 5–30$\mu$ | 5.1$\mu$ |
| Tests | | |
| i | passed | passed |
| ii | PC < 6 H | <6 H |
| ii | PMMA > 8 H < 9 H | >6 H |
| iii (25) | pass | pass |
| (50) | pass | pass |
| iv | PC pass | pass |
| v | PMMA pass | ? |
| vi | PC 50–75$\mu$ | 150–200$\mu$ |
| vii | 18–19 | 20–21 |
| viii | $\Delta$D = 30–40 $\Delta$T = 8–16 | $\Delta$D = 50–80 $\Delta$T = ~70 |
| ix | PC > 600 hrs | PC passed 500 hrs |
| x | 500–672 hrs | up to 500 hrs |

The results of Table XIII show that the scratch resistant films obtained from the composition behave equally or better than comparable commercially available material. However, being applicable as a one layer coating the composition of the invention is more simple to use than the two layers commercial composition.

What is claimed is:

1. A process for producing a UV-cured photopolymerizable composition for applying onto a substrate to provide thereon a transparent abrasion-resistance coating comprising:
   hydrolyzing a trialkoxysilane in an aqueous acidic solution,
   dispersing said hydrolyzed trialkoxysilane into intimate contact with finely divided pyrogenic or precipitated silica or alumina having a particle size of less than 0.1 micron to form a dispersion,
   chemisorbing said hydrolyzed trialkoxysilane onto the finely divided pyrogenic or precipitated silica or alumina by effecting dehydration of said dispersion by heating to 80° to 110° C. to yield organophillic particles, the amount by weight of hydrolyzed trialkoxysilane chemisorbed onto the silica or alumina being 20% or more relative the weight of the silica or alumina particles, dispersing said organophillic particles into intimate contact with one or more photopolymerizable monomers and one or more photoinitiators.

2. The process according to claim 1 wherein said trialkoxysilane is selected from the group consisting of γ-methacryloxypropyl-trimethoxysilane, γ-methacryloxypropyl-ethoxydimethoxysilane, γ-gylcidoxypropyl-trimethoxysilane, (3,4-epoxycyclohexyl)-ethyl-trimethoxy silane, isobutyl-trimethoxysilane, and octyl-triethoxysilane.

3. The process according to claim 1 wherein said photopolymerizable monomer is selected from the group consisting of methyl acrylate, methyl methacrylate, ethylene glycol diacrylate, 1,6-hexanediol diacrylate, 1,4-butanediol diacrylate, neopentylglycol diacrylate, diethylenegylcol diacrylate, tripropyleneglycol diacrylate, tetraethylenegylcol diacrylate, bisphenol-A diacrylate, trimethylolpropane triacrylate, pentaerythritol triacrylate, pentaerythritol tetra acrylate, dipentaerythritol pentaacrylate, epoxy-acrylate, acrylic prepolymer, acrylic polyester, ethylene glycol dimethacrylate, diethylene glycol dimethacrylate, triethylene glycol dimethacrylate, bisphenol-A dimethacrylate, 1,6-hexanediol dimethacrylate trimethylolpropane trimethacrylate, penta erythritol tetramethacrylate, trimethylolpropane triacrylate, and pentaerythritol triacrylate.

4. The process according to claim 1 wherein said photoinitiator is selected from the group consisting of benzophenone, Michler's ketone, ethyl 4-dimethylamino benzoate, benzil, 2-ethylanthraquinone, diethoxyacetophenone, and 2-chlorothioxanthane.

* * * * *